United States Patent [19]

Vetter et al.

[11] 4,023,354

[45] May 17, 1977

[54] SLURRIED PROPELLANT ROCKET MOTOR

[75] Inventors: Ronald F. Vetter; James P. Diebold, both of Ridgecrest; George F. Sieg, China Lake; Howard W. Gerrish, Jr., China Lake; Howard H. Payne, China Lake; Elmer J. Rhyn, China Lake; Irvin F. Witcosky, Ridgecrest, all of Calif.

[73] Assignee: The United States of America as represented by the Secretary of the Navy, Washington, D.C.

[22] Filed: Nov. 18, 1971

[21] Appl. No.: 200,247

[52] U.S. Cl. .............................. 60/252; 102/49.3
[51] Int. Cl.² .................................... F02K 9/00
[58] Field of Search .......... 60/252, 219, 255; 149/19, 76, 87; 102/49.3; 89/1.818; 244/3.23

[56] References Cited

UNITED STATES PATENTS

| 3,023,573 | 3/1962 | Friedman | 60/39.47 |
| 3,087,844 | 4/1963 | Hudson et al. | 149/19 |
| 3,369,455 | 2/1968 | Jones | 102/49.3 |
| 3,404,532 | 10/1968 | Olstein | 60/256 |

*Primary Examiner*—Samuel Feinberg
*Attorney, Agent, or Firm*—R. S. Sciascia; Roy Miller; David J. Aston

[57] ABSTRACT

Slurried rocket propellants and a spinning rocket motor wherein the propellants have viscosities which enable them to form central cores when spun in spinning rocket motors, the motor having a diaphragm-like base plate which assists in transferring forward momentum through the propellant.

3 Claims, 1 Drawing Figure

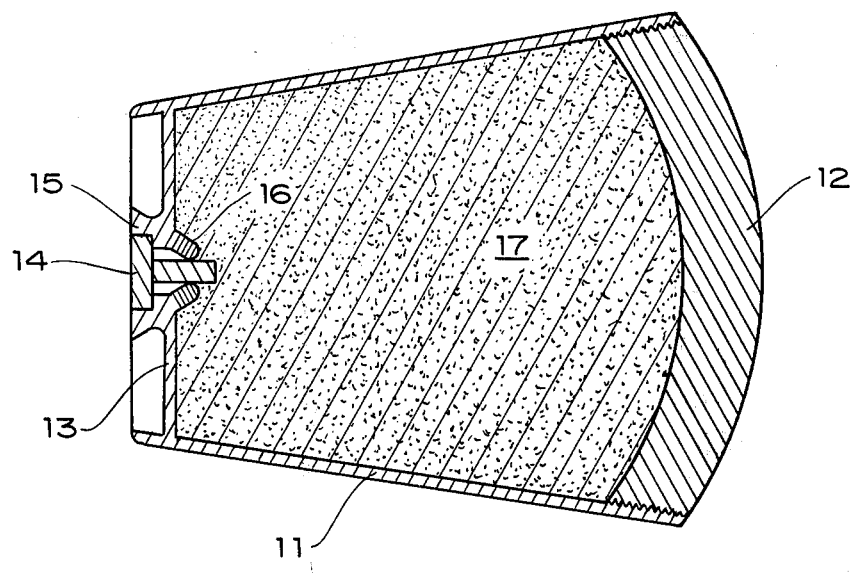

SLURRIED PROPELLANT ROCKET MOTOR

BACKGROUND OF THE INVENTION

1. Field of the Invention.

This invention relates to propellants for spinning rocket motors. More particularly, this invention relates to propellants which are loaded into rocket motors and ignited while the motors are spinning in flight.

2. Description of the Prior Art.

Rocket assisted projectiles (RAP's) are well known. A RAP is a projectile such as a warhead or artillery round which has a rocket motor attached to it to assist it in flight. A RAP is normally expelled from a gun with a rifled barrel which imparts both its initial forward impetus and a spinning motion to it. Then, after it is in flight, the attached rocket motor is ignited to give the projectile additional impetus. Since the projectile and the motor are spinning, motors attached to RAP's are called spinning rocket motors.

In the prior art, two types of motors have generally been utilized to assist RAP's. One type may be described as comprising a hollow cylinder closed at its forward end by a forward or front plate and partially closed at its rear end by a rigid base plate having an exhaust nozzle or port therethrough. The second type is well described in U.S. Pat. No. 3,434,419. It is similar to the first type with the exception that its base plate is slideably attached in a manner which permits the base plate to move forward in a piston-like manner when the motor is expelled from a gun. In order to be utilized as RAP motors, both types of motors have naturally been adapted, insofar as shape and external paraphernalia are concerned, to be expelled from guns. And, when such motors have been utilized as RAP motors, they have generally been charged with solid propellant grains.

The use of solid propellants creates many problems, especially with spinning rocket motors. Firstly, since the motor and the propellant contained therein both spin during flight there must be extremely strong bonding between the liner and the propellant grain. Extremely strong bonding is necessary to prevent the propellant grain from tearing free as a result of centrifugal force during flight. Secondly, since centrifugal force exerts tremendous pressures on the propellant grain, extreme care must be taken in loading and curing the propellant to insure that the grain does not become cracked or develop flaws. Further, after the propellant is loaded into the motor and cured, occasional inspections must be carried out to insure that a crack or flaw has not developed as a result of thermal cycles or mishandling.

SUMMARY OF THE INVENTION

It has now been found that the foregoing and attendant problems can be eliminated by utilizing slurried propellants in spinning rocket motors. The slurried propellants of this invention contain from about 8 to about 12 weight percent of uncured binder material such as hydroxy terminated polybutadiene or SAE 10-W-30 motor oil and from about 92 to about 88 weight percent of solid particles such as fuel, oxidizer and additive particles. When a slurried propellant according to this invention is loaded into a spinning rocket motor and the motor is expelled from a rifled gun barrel, the centrifugal force causes the propellant to be thrown outward against the cylinder wall of the motor. As a result of the centrifugal force, a central core is formed through the propellant. When a core is thus formed, the propellant is ignited in the core in the manner associated with centrally cored solid propellant grains.

It has also been found that rocket motor having a base plate which bows forward into the interior of the motor and acts in a diaphragm-like manner in transferring forward momentum through the propellant rather than through the cylinder wall is particularly suitable for use in conjunction with slurried propellants.

BRIEF DESCRIPTION OF THE DRAWING

The single FIGURE is a cross sectional view of a spinning rocket motor which is particularly suitable for use with slurried propellants.

DESCRIPTION OF THE PREFERRED EMBODIMENTS

Typical formulations for slurried propellants appear in Tables I and II below. The formulations described in the Tables are prepared in the manner generally utilized in preparing solid propellant mixes prior to casting. The formulations exhibit viscosities similar to those of similar solid propellant mixes before curing. They are loaded into rocket motors by the same techniques used in loading solid propellant mixes prior to curing. Unlike solid propellants, they are not cured after being loaded into rocket motors. That is, they do not have cross linking agents added. However, they produce specific impulses similar to those produced by corresponding solid propellants. Also, when they are spun in a spinning rocket motor, central cores similar to those associated with centrally cored solid propellants are formed. (Acceleration forces due to spin are often on the order of 11,000 times the acceleration of gravity in typical spinning rocket motors.)

TABLE I

| | Slurried Propellants With HTPB Binder | | | | | |
|---|---|---|---|---|---|---|
| Mix No. | 5346 Wt. % | 5347 Wt. % | 5348 Wt. % | 5349 Wt. % | 5350 Wt. % | 5351 Wt. % |
| R-45M | 12.00 | 10.00 | 10.00 | 10.00 | 10.00 | 10.00 |
| CAO-14 | 0.12 | 0.10 | 0.10 | 0.10 | 0.10 | 0.10 |
| Al(H-5) | | 20.00 | | | | |
| Al(123) | 20.00 | | | | | |
| AP(5 to 7µ) | | 14.68 | 20.00 | 25.00 | 30.00 | 35.00 |
| AP(200µ) | 33.94 | 26.56 | 34.85 | 32.35 | 29.85 | 27.35 |
| AP(400µ) | 33.94 | 28.66 | 34.85 | 32.35 | 29.85 | 27.35 |
| CB | | | 0.20 | 0.20 | 0.20 | 0.20 |

In Table I, R-45M is a designation for hydroxy terminated polybutadiene. CAO-14 is a designation for an antioxidant material having the formula

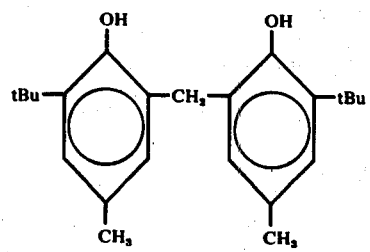

Al(H-5), Al(123), AP(5 to 7µ), AP(200µ), AP(400µ) are designations for well known commercially available forms of aluminum powder and ammonium perchlorate. CB is a designation for carbon black.

TABLE II

Slurried Propellants with Motor Oil Binder

| Mix No. | MO-7 Wt. % | MO-9 Wt. % | MO-10 Wt. % |
|---|---|---|---|
| 10-W-30 Oil | 10.00 | 10.00 | 10.00 |
| Al(H-5) | 12.00 | 18.75 | 18.50 |
| AP(400μ) | 35.00 | 35.00 | 35.00 |
| AP(200μ) | 17.50 | 17.50 | 17.50 |
| AP(45μ) | 17.50 | 17.50 | 17.50 |
| SiO$_2$ | 1.00 | 1.25 | 1.50 |

In the above Tables, it will be noted that Table I lists slurried propellant formulations which utilize hydroxy terminated polybutadiene as the uncured binder material and that the formulations of Table II utilize 10-W-30 motor oil as the binder material. It will also be noted that the weight percents listed in the Tables are very specific. However, it should be recognized that the formulations given are typical and not exclusive. In other words, similar formulations can be used in lieu of those specifically listed in the Tables. For example, it has been found that formulations containing as much as 12.00 weight percent or as little as 8.00 weight percent of either binder material listed have excellent properties in that the solid particles do not tend to settle out even when the propellant is stored for long periods of time. Other binder materials can be used such as liquid polybutadiene acrylonitrile or carboxy terminated polybutadiene.

When slurried propellants are used in spinning rocket motors, it is preferable that the exhaust nozzle be closed prior to ignition in order to prevent the propellant from being ignited by the gun gases. It has also been found that it is preferable to ignite the propellant near or at the forward end of the core formed by centrifugal force. Both of these purposes (closed exhaust nozzle prior to ignition and ignition at forward end of core) can be accomplished by utilizing an igniter which fits into grooves in the base plate of the motor plugging the exhaust nozzle and fires its ignition means forward when activated. Such igniters are blown out of the base plate grooves by pressure from expanding gases leaving the exhaust nozzle open and free to function once the propellant has been ignited.

When slurried propellants are used in spinning rocket motors of the type having a piston-like base plate (see U.S. Pat. No. 3,434,419) it is preferable that the interior of the motor be completely filled with propellant in order to allow the piston-like base plate to achieve its full potential insofar as transfer of forward momentum through the propellant is concerned. On the other hand, it is preferable to provide for an ullage void in motors having rigid base plates to allow for differences in thermal expansion. The propellant in such motors tends to preignite (ignite upon expulsion from the gun rather than on activation of the ignition means) if the ullage void is not located at the forward end of the motor.

A forward ullage void may be provided in motors having a removable forward plate and utilizing hydroxy terminated polybutadiene by carrying out the following steps. Firstly, set the motor which has been filled with propellant to a desired level in an upright position. (A desired level is one which will leave a desired distance or ullage void between the forward surface of the propellant and the inner surface of the forward plate. An upright position is one in which the forward end of the motor is up and the base plate end is down.) Secondly, remove the removable forward plate. Thirdly, place a filter paper having a carefully metered amount of toluene diisocyanate (TDI) or some other suitable cross linking agent across the interior of the motor at a level about three-eighths to one-half inch above the surface of the propellant. Fourthly, cap the forward end of the motor with a plastic or some other suitable cap. Finally, allow the capped motor with the cross linking agent containing filter paper in place to stand for about 18 to 30 hours at a temperature of from about 170° to 190° F. Carrying out the above steps will cause the cross linking agent to evaporate from the filter paper and react with the binder material near the upper or forward surface of the propellant forming a thin layer of cured propellant. The thin layer of cured propellant will then hold the remainder of the propellant, which remains a slurry, in place and insure a forward ullage void even if the motor is later stored on its side or upside down. (Rocket assisted projectiles are commonly stored on their sides.) As a more specific example of how to insure a forward ullage void, in rocket motors having inside diameters of about 5 inches and containing uncured, hydroxy terminated polybutadiene conaining propellants, filter papers containing from 0.25 cc to 0.5 cc of toluene diisocyanate produced layers of cured propellant having thicknesses ranging from about 0.030 to 0.080 inch. These thicknesses were found to be ample to insure a forward ullage void.

In addition to the above-described well known types of motors, slurried propellants can be used in a third type of spinning rocket motor. This type of motor is depicted in cross section in the single FIG. of the drawing.

The single FIG. shows a rocket motor comprising a cylinder 11, a forward plate 12, and a base plate 13. The motor is filled with a charge of slurried propellant 17 and the exhaust nozzle of the motor is closed with an igniter 14 which is adapted to fit into grooves in a backward projection 15 of the base plate in a manner whereby the igniter will be blown out of the grooves by pressure from expanding gas after the slurried propellant is ignited. A nozzle insert 16 encircles the exhaust nozzle and extends somewhat into the interior of the motor. A projectile can be attached to the forward end of the forward plate in any convenient manner, i.e., by welding or by means of a threaded projection not shown. Or, the forward plate may be the rear plate of a projectile. Naturally, if the motor is to be expelled from a gun, certain external paraphernalia (not shown) must be present.

The base plate 13 is attached or integrally formed with the cylinder 11 and a grooved backward projection 15 of the base plate holds the igniter. The base plate 13 is much thinner in cross section than base plates normally utilized in either rigid base plate type motors or piston base plate type motors. Motors having rigid or piston-like base plates are normally at least 1 inch or more in thickness. The base plate of the motor depicted in the drawing is preferably from about 0.06 to 0.125 inch in thickness and slightly thinner than the cylinder wall which has a thickness in the same range. The reason for having a relatively thin base plate is that when a motor of the type depicted is expelled (fired) from a gun, pressure from the gun bows the base plate forward. This forward bowing causes the base plate to act in a diaphragm-like manner transferring forward momentum to the forward plate through the propellant. Thin cylinder walls are permissible because most of the forward momentum is transferred through the propellant rather than through the wall.

One consideration that must be taken into account in deciding what thickness of base plate and cylinder wall to utilize in motors of the type depicted is that of how much internal pressure is generated by the propellant. Not only must the cylinder wall and base plate be able to withstand the pressure exerted when the motor is fired from a gun but they must also be able to withstand the internal pressure exerted by the propellant after ignition without bursting.

The use of a thin, diaphragm-like base plate and a thin cylinder wall permits the use of a larger charge of propellant in a motor having a given outside diameter than is possible where a thicker cylinder wall and base plate must be used. Tests have shown that RAP's utilizing 5 inch outside diameter motors with diaphragm-like base plates can achieve distances up to 40 percent greater than RAP's utilizing rigid base plate motors having the same outside diameter.

What is claimed is:
1. A spinning rocket motor adapted to be expelled from a gun which comprises:
 a. a cylinder having a forward end and a rear end;
 b. a forward plate closing the forward end of said cylinder;
 c. a base plate having an exhaust port therethrough forming a rear wall of the cylinder, said base plate having a cross sectional thickness such that it bows inwardly and acts in a diaphragm-like manner in transferring forward momentum through propellant in said motor to said forward plate when said motor is fired from a gun.
2. A spinning rocket motor according to claim 1 which is substantially filled with slurried propellant.
3. A spinning rocket motor according to claim 2 having an outside diameter of about 5 inches, a cylinder wall thickness in the range of from about 0.06 to 0.125 inch and a base plate thickness in the range of from about 0.06 to 0.125 inch.

* * * * *